US006471356B1

(12) United States Patent
Gohman et al.

(10) Patent No.: US 6,471,356 B1
(45) Date of Patent: Oct. 29, 2002

(54) PORTABLE IMAGE PROJECTION SYSTEM HAVING REDUCED WEIGHT AND PROFILE

(75) Inventors: Jeffrey A. Gohman, Hillsboro, OR (US); Mark Peterson, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 86 days.

(21) Appl. No.: 09/637,180

(22) Filed: Aug. 11, 2000

Related U.S. Application Data

(63) Continuation-in-part of application No. 09/405,425, filed on Sep. 22, 1999.
(60) Provisional application No. 60/134,473, filed on May 17, 1999.

(51) Int. Cl.[7] .......................... G03B 21/00; G03B 21/28; G03B 21/20; G02F 1/1335; G02F 1/03
(52) U.S. Cl. .............................. 353/33; 353/31; 353/81; 353/102; 349/5; 349/61; 359/242
(58) Field of Search ................................. 353/119, 121, 353/122, 81, 102, 30, 31, 33, 38, 84; 359/242; 348/771; 349/5, 61

(56) References Cited

U.S. PATENT DOCUMENTS

| | | | | |
|---|---|---|---|---|
| 548,495 | A | | 10/1895 | Abbe .......................... 350/286 |
| 957,502 | A | | 5/1910 | Dupuis |
| 3,659,918 | A | | 5/1972 | Tan ............................ 350/166 |
| 3,932,027 | A | | 1/1976 | Cook et al. ................. 350/173 |
| 4,084,180 | A | | 4/1978 | Stoffels et al. .............. 358/55 |
| 4,969,730 | A | | 11/1990 | van den Brandt ........... 353/31 |
| 5,993,007 | A | * | 11/1999 | Jung ............................ 353/34 |
| 6,155,687 | A | * | 12/2000 | Peterson ...................... 353/84 |
| 6,179,424 | B1 | * | 1/2001 | Sawamura ................... 353/33 |
| 6,264,331 | B1 | * | 7/2001 | Sawai et al. ................. 353/31 |
| 6,336,724 | B1 | * | 1/2002 | Shouji et al. ................ 353/20 |
| 6,359,719 | B1 | * | 3/2002 | Ori ............................ 359/242 |
| 6,412,951 | B1 | * | 7/2002 | Sawai ......................... 353/31 |

FOREIGN PATENT DOCUMENTS

DE 3901166 7/1990 ............ G03H/1/22

OTHER PUBLICATIONS

"The Computer Videomaker Handbook" 2nd Edition, Chapter 1, "All About Lenses" by Jim Stinson, pp. 3–11, copyright 2001 by Butterworth–Heinemann, Focal Press.*
"The American Cinematographer Manual", Sixth Edition, copyright 1986, The ASC Press, pp. 82–84.*
Defensive Publication No. T938,006, Sep. 2, 1975, Joseph F. Stephany.

* cited by examiner

Primary Examiner—Russell Adams
Assistant Examiner—Melissa J Koval
(74) Attorney, Agent, or Firm—Stoel Rives LLP

(57) ABSTRACT

An image projector employs a prism assembly that receives incident light, illuminates a reflective light modulator, and receives therefrom reflected imaging light for direction toward a small-diameter light entry pupil of a light-weight, compact projection lens. The prism assembly includes compensating and output prism components having opposed surfaces separated by an air gap. The prism assembly sets up a correct illumination angle on the DMD and then separates the incident illumination light from the reflected imaging light. Each on-state micromechanical DMD mirror reflects the illumination light nearly normal to a horizontal datum plane, forming reflected imaging light that reflects off the air gap and reenters the prism assembly through the output prism component. A focusing lens disposed between the prism assembly and the DMD refracts the reflected imaging light into a converging imaging light bundle compatible with the small diameter light entry pupil of the projection lens.

17 Claims, 9 Drawing Sheets

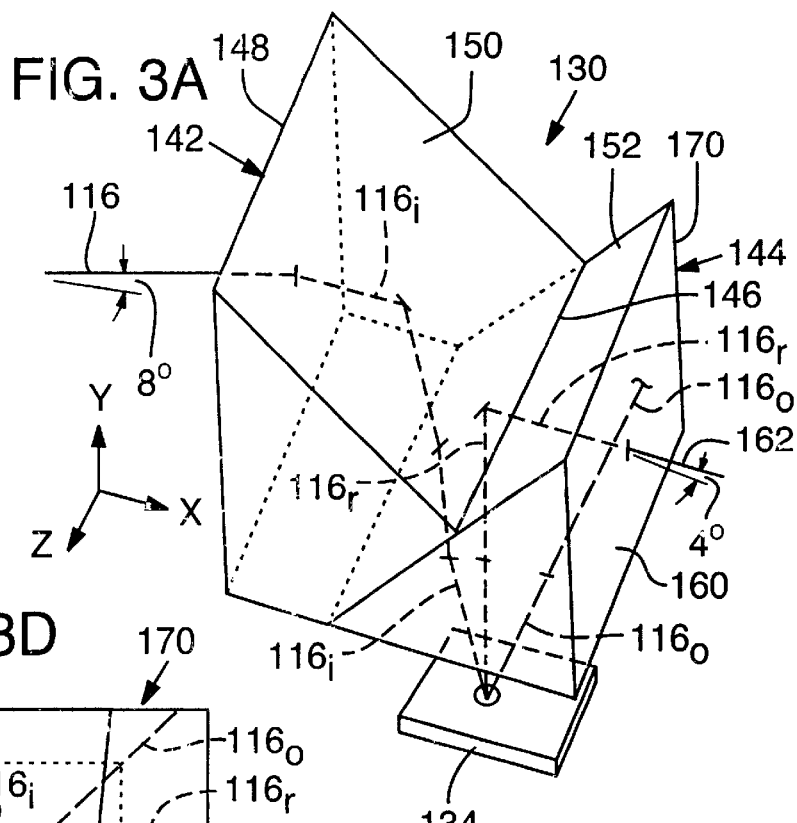
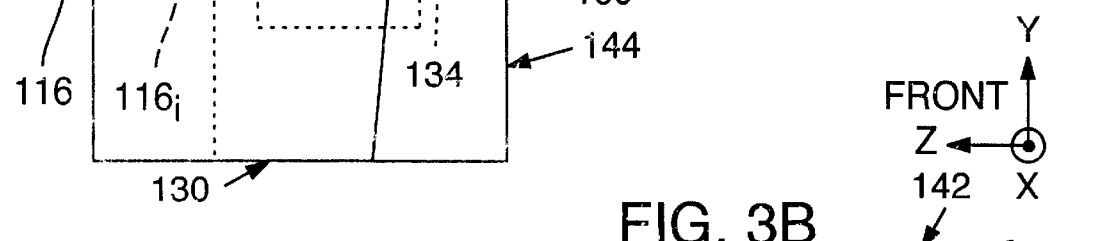
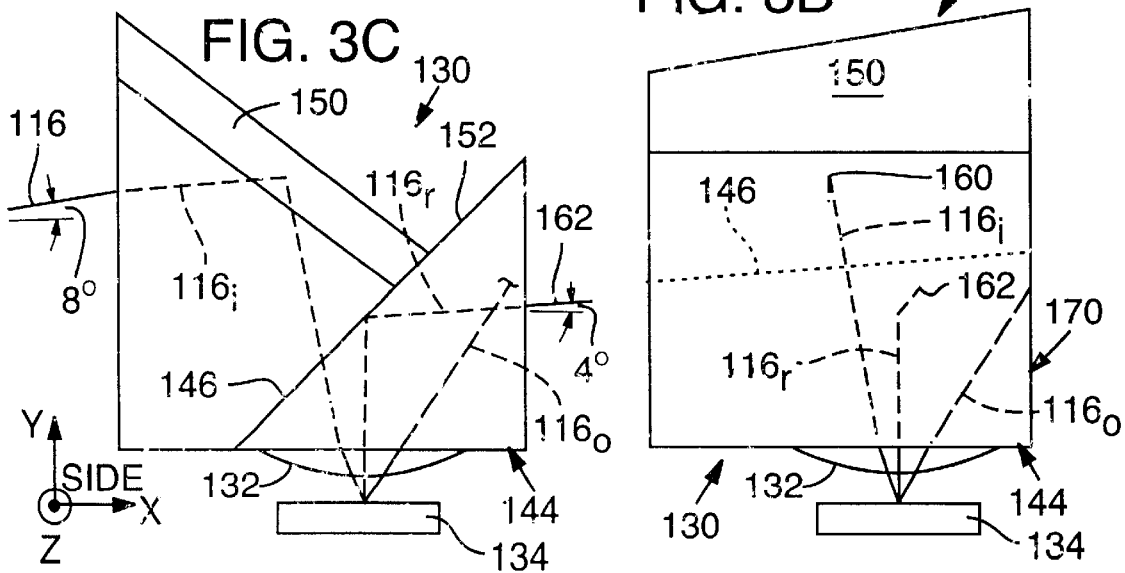

PORTABLE IMAGE PROJECTION SYSTEM HAVING REDUCED WEIGHT AND PROFILE

This application is a continuation-in-part of U.S. patent application Ser. No. 09/405,425, filed Sep. 22, 1999, for IMAGE PROJECTION SYSTEM PACKAGED TO OPERATE LYING FLAT WITH A VERY LOW PROFILE, which claims the benefit of U.S. Provisional Application No. 60/134,473, filed May 17, 1999.

FEDERALLY SPONSORED RESEARCH OR DEVELOPMENT

None

TECHNICAL FIELD

This invention relates to image display systems and, in particular, to an image projection system implemented with a reflective light modulator and having an optical system that reduces weight and packaging profile.

BACKGROUND OF THE INVENTION

The following description is presented with reference to an image projector implemented with a reflective light modulator of a digital micromirror device ("DMD") type but is applicable also to image projectors implemented with other types of reflective light modulators. Image projectors currently implemented with DMDs require that the projector housing or DMD-illuminating light beam-directing optics contained within the projector housing be tilted at a 45 degree angle relative to a support table on which the image projector rests. This is done to cause the illuminating light to impinge on the DMD from either above or below its light reflecting surface and thereby provide a correct orientation of the DMD relative to a projection screen on which an image can be viewed. Inclining the projector or its components causes the projector to occupy an undesirably tall space when it is in use. Currently available single DMD projectors are taller than 10 cm in their operating positions. Using a tilting mechanism to thin the profile to less than 10 cm requires a tilting mechanism that raises the operating height by a corresponding amount.

FIGS. 1A, 1B, 1C, and 1D are respective isometric, frontal, side elevation, and top plan views of such a prior art image projector 10, which includes a high power lamp 12 positioned at the focus of an elliptical reflector 14 to produce a high intensity illumination beam characterized by a principal ray 16 that propagates through a rotating color wheel disk 18 of a color wheel assembly 20. Disk 18 includes at least three sectors, each tinted in a different one of three primary colors to provide a field sequential color image capability for image projector 10. The illumination beam propagates through an integrator tunnel 22 to create at its output end a uniform illumination pattern that lens elements 24, 26, and 28 image onto a DMD 30.

The illumination beam propagating from integrator tunnel 22 is directed by a mirror 32 that is inclined so that the illumination beam propagates upwardly at a 45 degree angle relative to the plane of the supporting table for image projector 10 and exits lens element 26 toward a prism assembly 40. Prism assembly 40 is composed of prism components 42 and 44 that are spaced apart by an air space interface 46. After reflection by mirror 32, principal ray 16 of the illumination beam strikes a surface of lens element 28. An incident light beam derived from principal ray 16 propagates through prism component 42 and, by total internal reflection, reflects off of a surface 50 at air space interface 46 to form a reflected incident light beam. The reflected incident beam propagates through prism component 42 to strike DMD 30. DMD 30 in its "on" light reflecting state (on-state) reflects an imaging light beam propagating normal to the plane of DMD 30 through prism component 42 and, without total internal reflection, through air space interface 46 into prism 44 to exit through an exit face 60 of prism component 44. The imaging light beam that passes through exit face 60 is characterized by a principal ray 62 and propagates through a projection lens 64 to a projector screen (not shown) to display an image to a viewer. DMD 30 in its "off" light reflecting state (off-state) reflects light by total internal reflection off of a face 68 of prism component 44.

The angles of the faces and the shapes of prism components 42 and 44 are selected so that the incident light beam, reflected incident light beam, and imaging light beam propagating within prism assembly 40 are coplanar. The arrangement of the components of image projector 10 results in the upward inclination of prism assembly 40 and thereby dictates for a housing (not shown) of projector 10 a minimum height that is greater than a minimum height that would be possible with an uninclined prism assembly and principal rays 16 and 62 propagating along essentially the same vector.

Reducing its height is one step in achieving true portability for image projector 10. Reducing its weight (mass) would be another beneficial step toward true portability. The image projector market is demanding projectors that can be carried along with a companion laptop computer in a briefcase.

SUMMARY OF THE INVENTION

An object of this invention is, therefore, to provide a truly portable image projector apparatus.

Another object of this invention is to provide an image projector weighing less than about 2.27 kilograms (five pounds) and having a height less than about 6.35 centimeters (2.5 inches).

A further object of this invention is to provide an image projection optical system suitable for use with a light-weight and compact projection lens.

This invention is suitable for use in an image projector employing a reflective light modulator, such as a DMD, and a prism assembly that illuminates the DMD and receives a reflected imaging light bundle for directing toward a projection lens.

The prism assembly includes compensating and output prism components having opposed surfaces separated by an air gap. The prism assembly sets up a correct illumination angle on the DMD and then separates incident illumination light from reflected imaging light by total internal reflection discrimination. The illumination light enters the prism assembly and reflects by total internal reflection off a top surface of the compensating prism component. The top surface has a compound angle that directs the light toward the DMD at the correct angle for illumination. For each micromechanical mirror of the DMD in its on-state, the illumination light reflects nearly normal to the horizontal datum plane to form imaging light that reenters the prism assembly through the output prism component. Because the angle of incidence at the air gap is greater than the critical angle, the imaging light reflects off the air gap and propagates through the output prism component.

A focusing lens of this invention is disposed between the prism assembly and the DMD to refract all the reflected imaging light into a converging imaging light bundle as it propagates into a small diameter light entry pupil of a light-weight, compact projection lens.

In an alternative embodiment, the focusing lens is implemented as a curved surface on the side of the prism assembly facing the reflective light modulator. This embodiment reduces weight, complexity, and space, but adds to the cost and complexity of the prism assembly.

An advantage of the focusing lens of this invention is that the projection lens requires a light entry pupil having a diameter that is only 30 to 50 percent the diameter of prior art entry pupils.

Another advantage of the focusing lens of this invention is that the projection lens has a mass and a length that is about 50 to 75 percent of prior art projection lenses.

Additional objects and advantages of this invention will be apparent from the following detailed description of preferred embodiments thereof, which proceeds with reference to the accompanying drawings.

BRIEF DESCRIPTION OF THE DRAWINGS

FIGS. 3A, 3B, 3C, and 3D are respective isometric, frontal, side elevation, and top plan views showing the spatial arrangement of a prism assembly, alternative focusing lens embodiment, and a reflective light modulator implemented in the embodiment of FIGS. 2A–2E.

DETAILED DESCRIPTION OF PREFERRED EMBODIMENTS

Figure 1A:
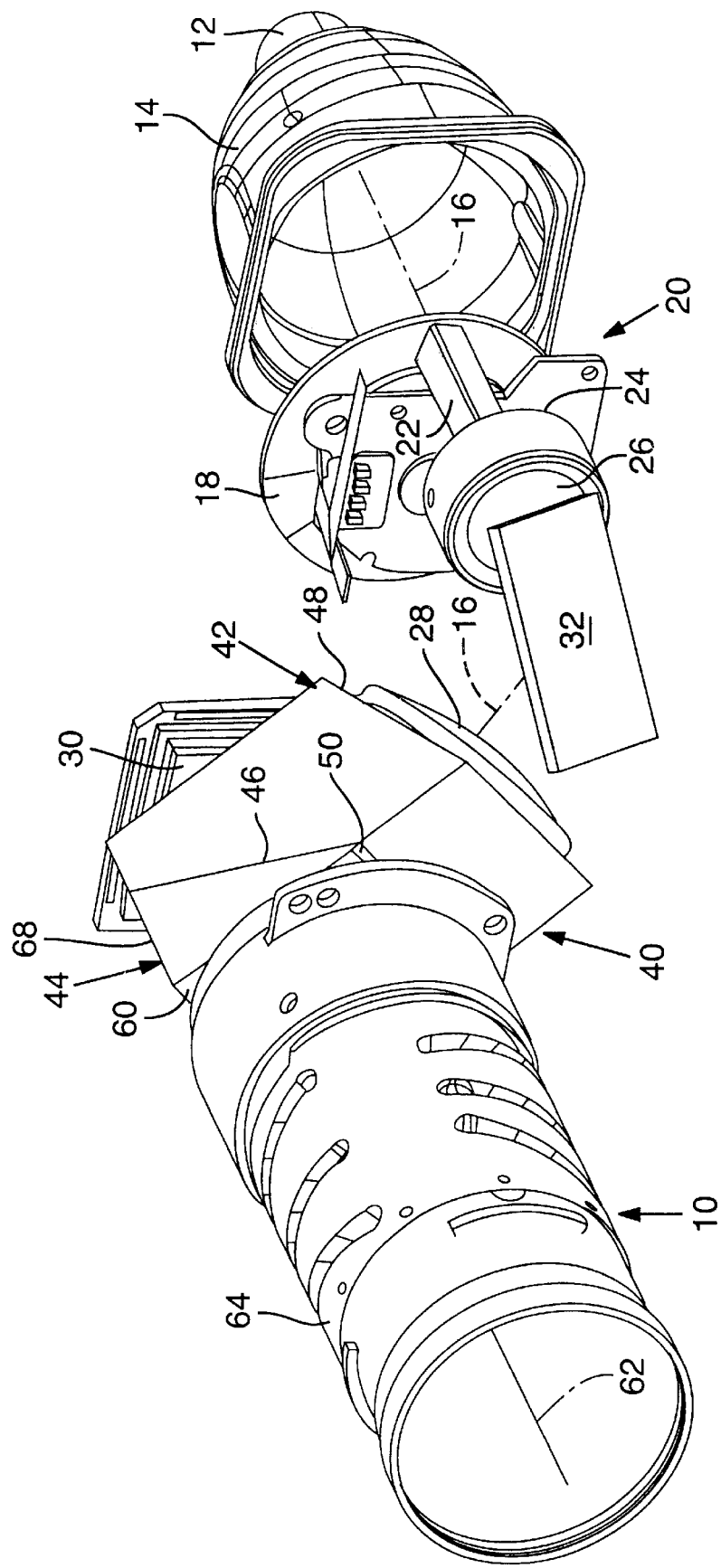
FIGS. 1A, 1B, 1C, and 1D are respective isometric, frog side elevation, and top plan views of a prior art image projector.
Figure 1B:
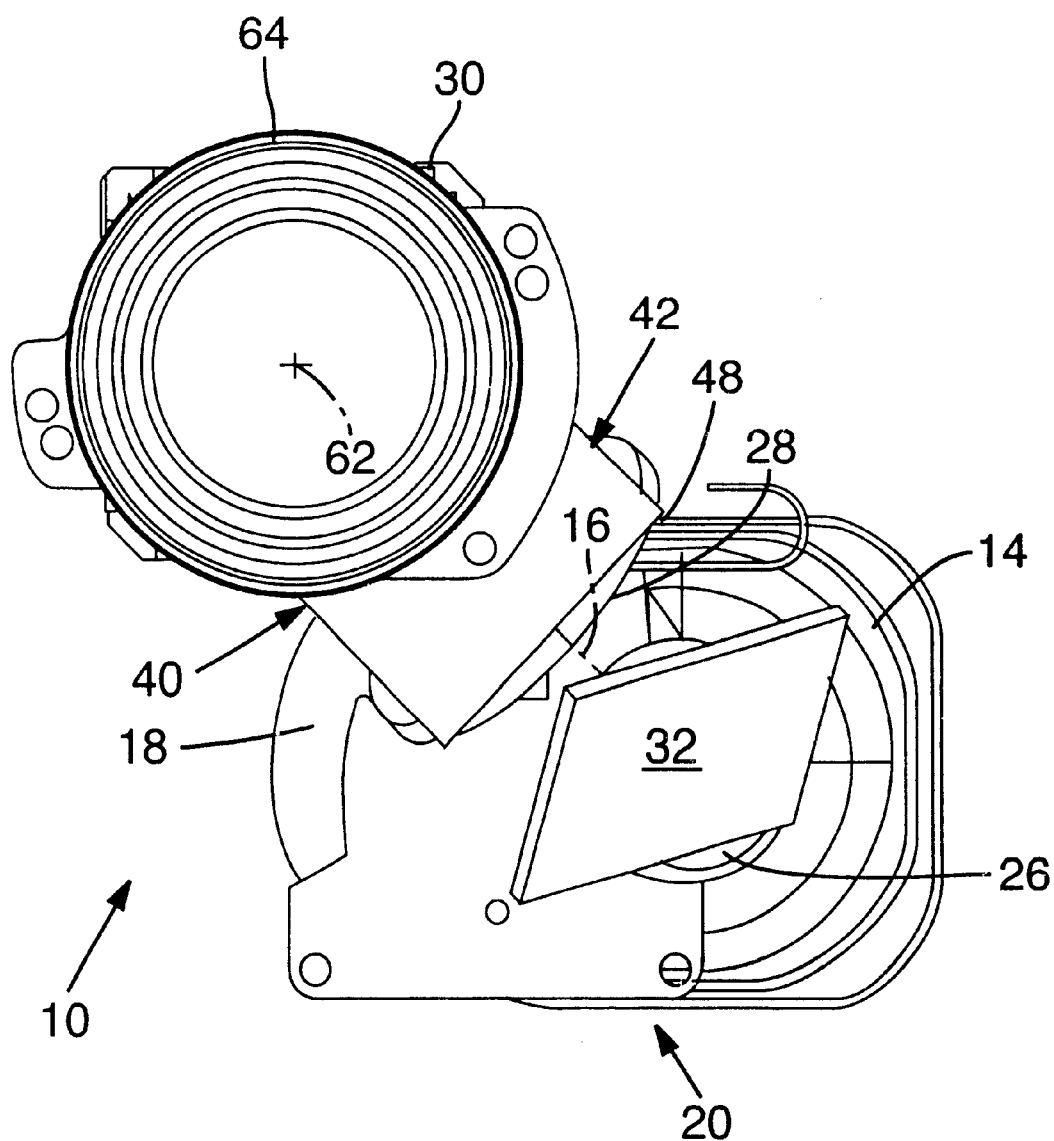
Figure 1C:
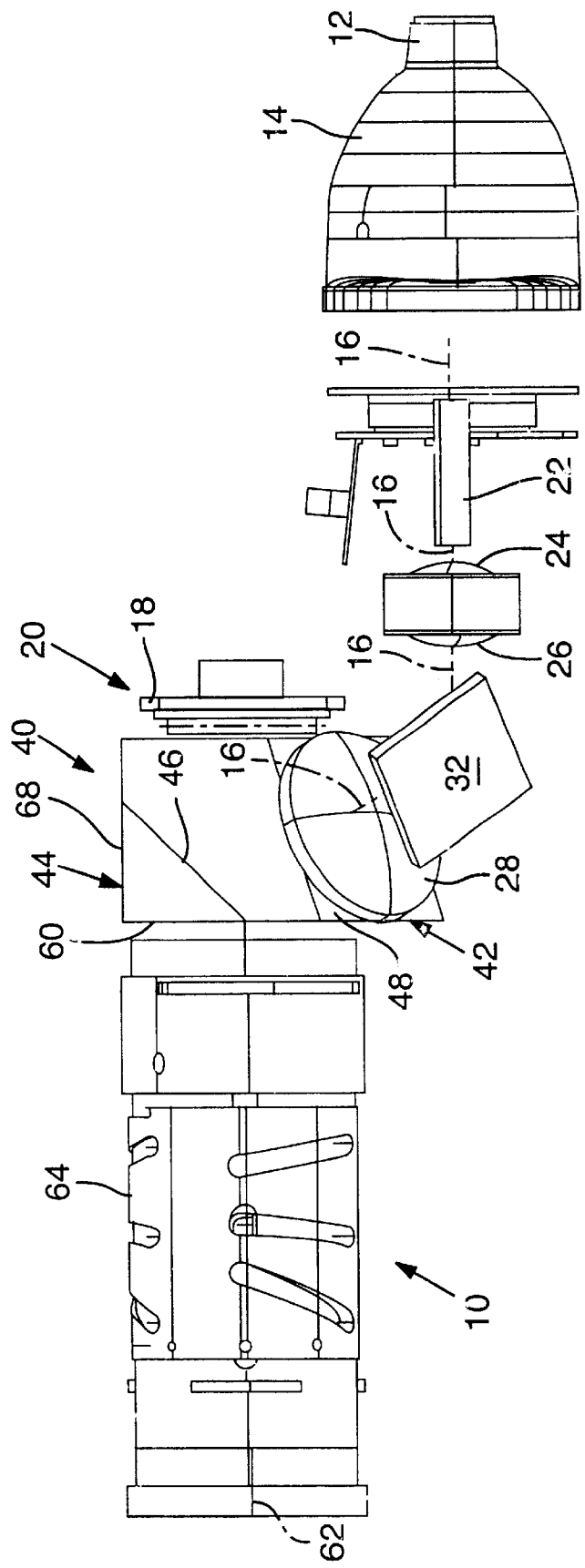
Figure 1D:
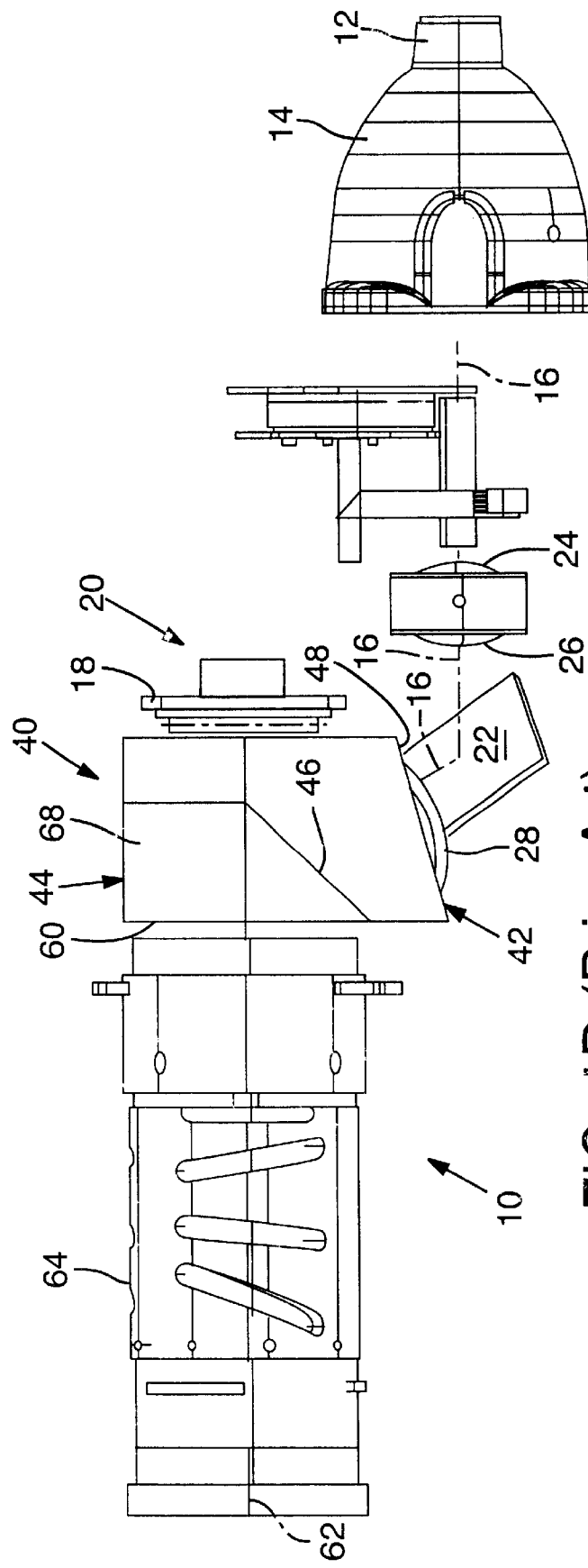
Figure 2A:
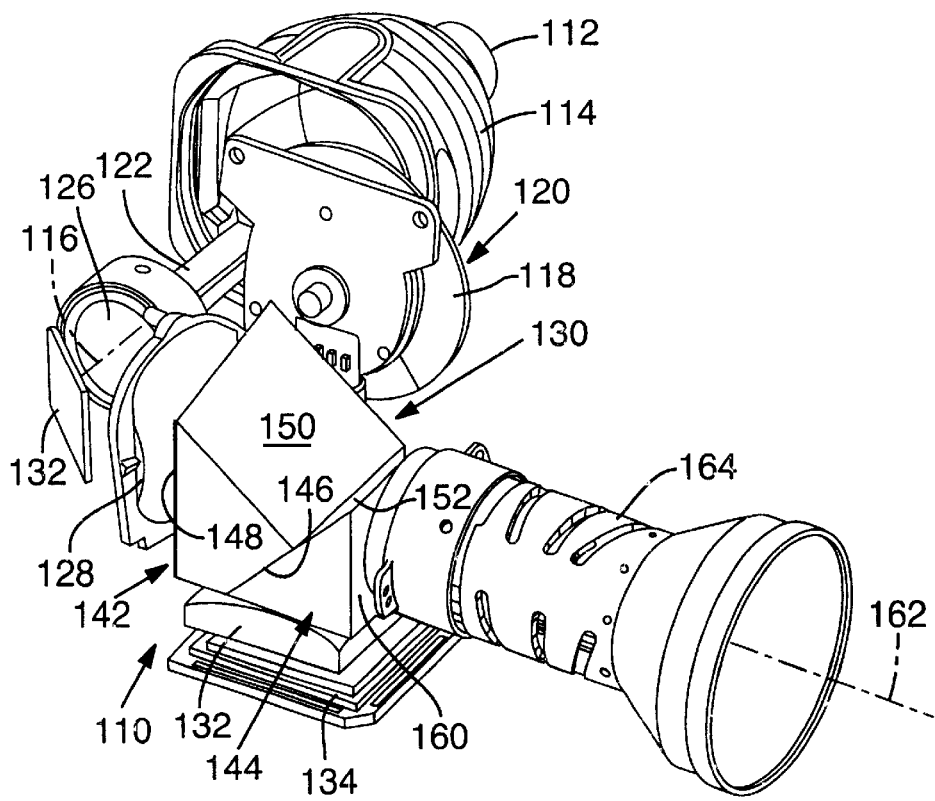
FIGS. 2A, 2B, 2C, 2D, and 2E are respective isometric, frontal, side elevation, top plan, and rear end views of a representative embodiment of this invention.
Figure 2B:
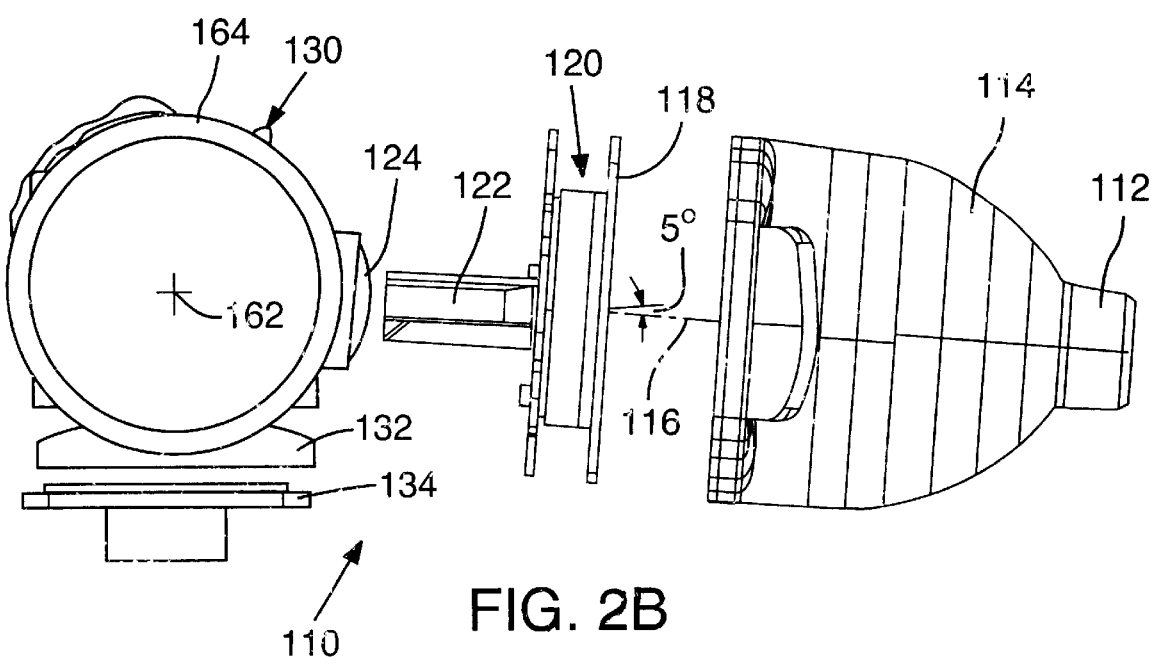
Figure 2C:
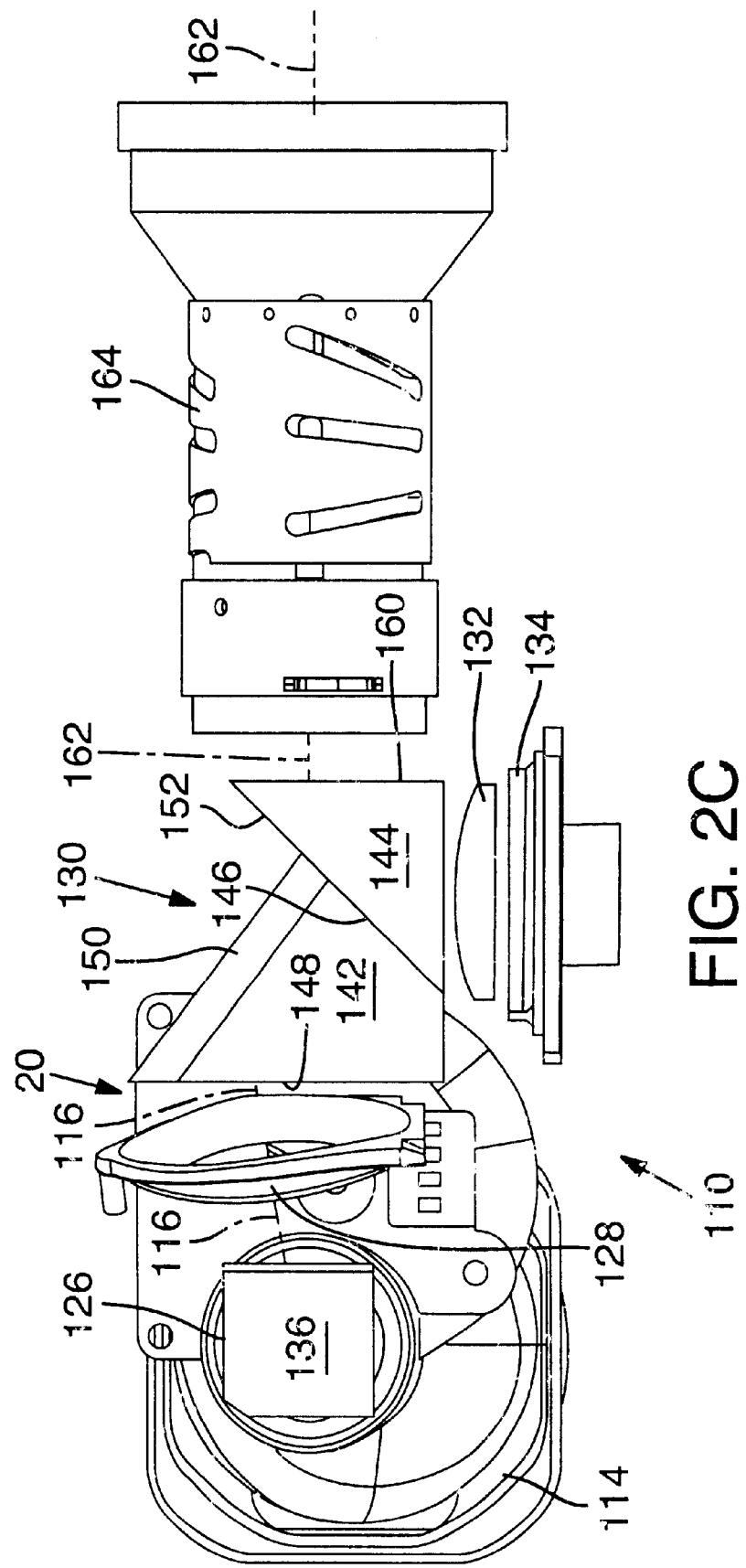
Figure 2D:
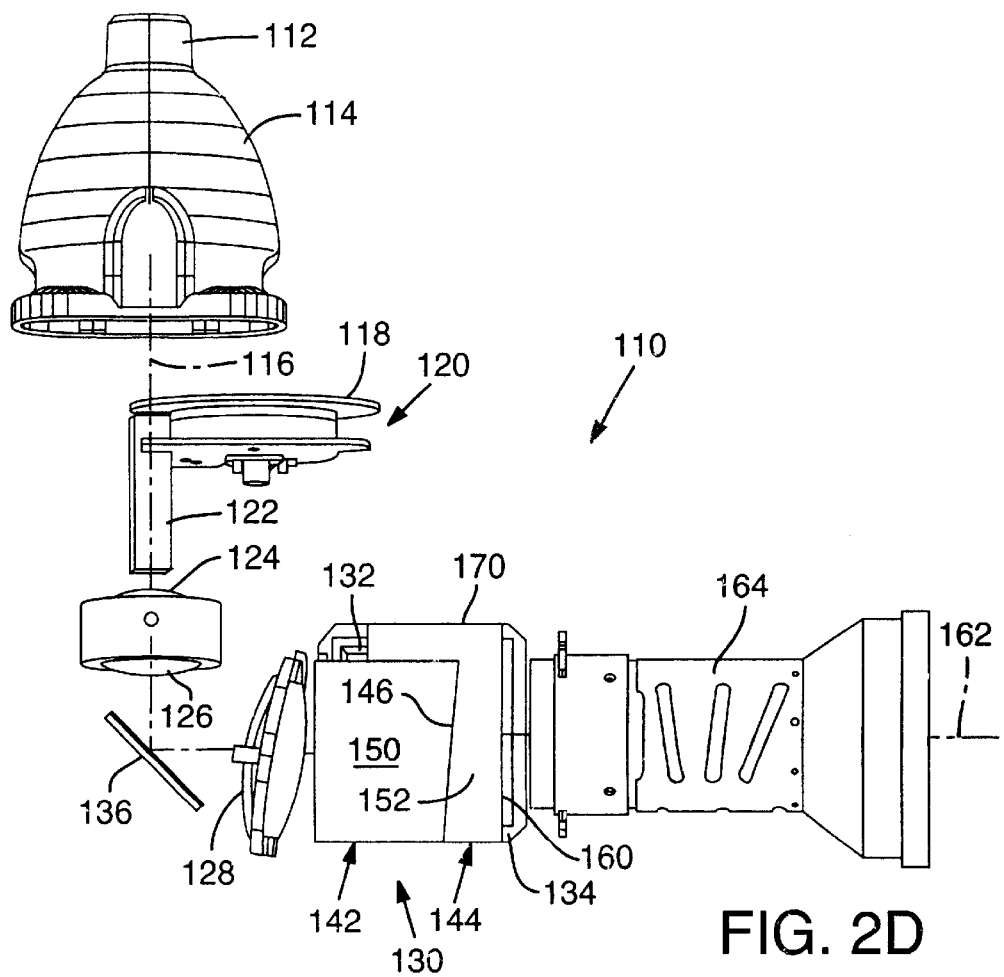
Figure 2E:
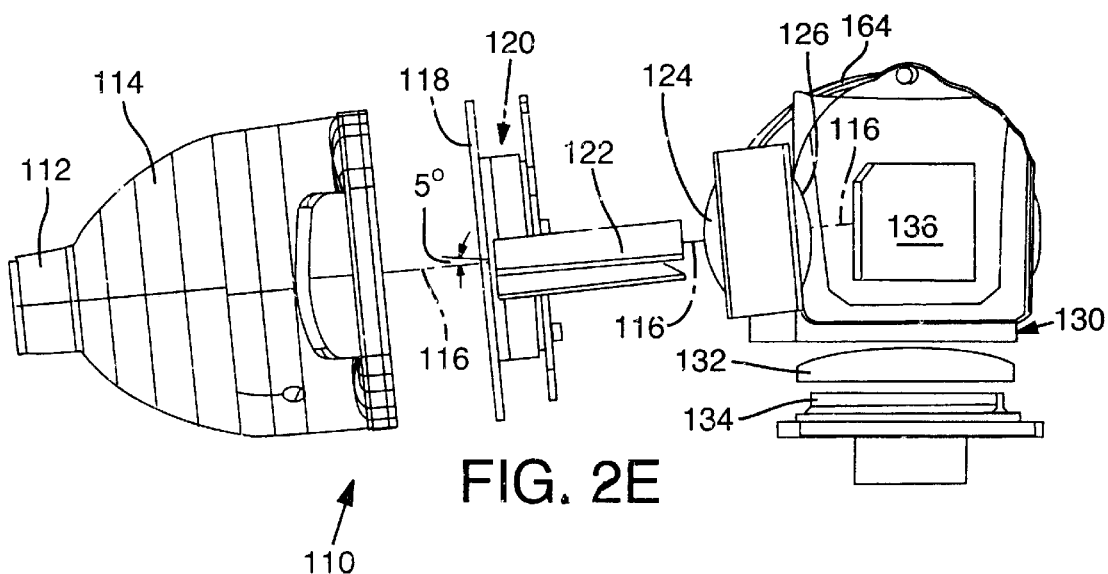

U.S. patent application Ser. No. 09/405,425, filed Sep. 22, 1999, for IMAGE PROJECTION SYSTEM PACKAGED TO OPERATE LYING FLAT WITH A VERY LOW PROFILE, which this application relies for an earlier filing date under 35 U.S.C. §120, is incorporated herein by reference.

FIGS. 2A, 2B, 2C, 2D, and 2E are respective isometric, frontal, side elevation, top plan, and rear end views of an image projection system 110 suitable for explaining the use of this invention. Projection system 110 includes a high power lamp 112 positioned at a focus of an elliptical reflector 114 to produce a high intensity illumination beam that is characterized by a principal ray 116. Lamp 112 is preferably a 120 watt, high pressure mercury arc lamp, which is suitable for use in an image projector to achieve its lifetime and lumen specifications.

Lamp 112 is positioned at the first focus of elliptical reflector 114, which has a cold mirror surface that reflects forward only visible light, while much of the infrared and ultraviolet light is transmitted and absorbed in the housing of elliptical reflector 114. The second focus of elliptical reflector 114 is positioned one-half the distance between the front face of a rotating color wheel disk 118 of a color wheel assembly 120 and an integrator tunnel 122. As shown best in FIGS. 2B and 2E, elliptical reflector 114 is tilted upwardly 5 degrees from a horizontal datum plane to minimize the height of projection system 110. Color wheel disk 118 rotates at about 7,200 rpm, which is twice the system video image refresh rate, to sequentially display red, green, and blue images on a projection screen (not shown). Color wheel disk 118 may also include a white segment that functions to increase lumens while decreasing color saturation. All segments of color wheel disk 118 have ultraviolet reflective coatings to prevent ultraviolet light from reaching ultraviolet light sensitive components in the optical system.

Integrator tunnel 122 creates at its output end a uniform illumination pattern and facilitates delivering the illumination light past the motor of color wheel assembly 120 so that the motor does not create a shadow in the illumination. Integrator tunnel 122 includes a solid glass rod that relies on total internal reflection to transfer light through it. Integrator tunnel 122 may also include a cladding that supports the integrator tunnel without disrupting total internal reflection. The uniform illumination pattern of light propagating from the output end of integrator tunnel 122 has a rectangular shape that is imaged through lens elements 124, 126, and 128, a prism assembly 130, and a focusing lens 132 onto a light reflecting surface of a DMD 134. Focusing lens 132 is described with reference to FIG. 5.

Integrator tunnel 122 is rotated 8 degrees about its major axis to correct for rotation in the illumination on DMD 134, which rotation is caused by prism assembly 130. DMD 134 is preferably a Texas Instruments Model DMD 1076 spatial light modulator composed of a rectangular array of aluminum micromechanical mirrors, each of which can be individually deflected at an angle of ±10 degrees about a hinged diagonal axis. The deflection angle (either positive or negative) of the mirrors is individually controlled by changing the memory contents of underlying addressing circuitry and mirror reset signals. Lens element 128 is tilted upwardly 6 degrees from the horizontal datum plane and rotated −10 degrees about the vertical axis to partly correct for distortion caused by oblique illumination of DMD 134. A beam direction turning mirror 136 positioned between an exit face of lens element 126 and an entrance face of lens element 128 turns the beam direction in an X-Z plane (FIGS. 3A–3D) by about 90 degrees within the housing of projection system 110.

Illumination light exiting lens element 128 enters prism assembly 130, which is comprised of a first or compensating prism 142 and a second or output prism component 144 that are spaced apart by an air space interface 146. Prism assembly 130 allows DMD 134 to lie flat when in operation. Prism assembly 130 sets up the correct illumination angle on DMD 134 and separates by total internal reflection discrimination the illumination light from the imaging light reflected by DMD 134 in its on-state. The illumination angles for DMD 134 are controlled by the angles of the faces of prism assembly 130 and the refraction of focusing lens 132. Prism assembly 130 and focusing lens 132 refract and reflect the incident light bundle so that DMD 134 is illuminated from a corner with a projection angle partly built into the output light bundle. After the illumination light reflects off DMD 134 in its on-state, imaging light exits prism assembly 130 along essentially the same propagation direction as that of illumination light entering prism assembly 130. Because of the many degrees of freedom in prism assembly 130, light can enter it roughly parallel to a support table and in line with a projection lens. Preferably, DMD 134 is mounted on an etched circuit board that covers the bottom of the projector. This provides a cost-effective solution because it eliminates the need for a high-density electrical connector otherwise required between the printed circuit board and an off-board DMD.

FIGS. 3A, 3B, 3C, and 3D are respective isometric, frontal, side elevation, and top plan views of prism assembly 130. Principal ray 116 of the illumination beam propagates generally in the X direction and strikes an entrance surface 148 of prism component 142 upwardly at an 8 degree angle relative to a horizontal datum plane, which in FIGS. 3A, 3C, and 3D is the X-Z plane. An incident beam derived from principal ray 116 and characterized by a principal ray $116_i$ propagates through prism component 142 and, by total internal reflection, reflects off a top surface 150 of prism component 142. Top surface 150 of prism component 142 is set at a compound angle relative to the coordinate system shown in FIGS. 3A–3D that directs principal ray $116_i$ toward DMD 134 at a 24 degree angle measured relative to the normal of the X-Z horizontal plane and the projection of principal ray $116_i$ onto the X-Z plane at a 40 degree angle of rotation from the X-axis. The principal ray angle is less than the critical angle at the air gap interface surface that is characteristic of the glass from which prism component 142 is formed. Principal ray $116_i$ passes, therefore, without total internal reflection through air space interface 146 toward focusing lens 132 and DMD 134.

FIGS. 3B and 3C further show an alternative embodiment in which focusing lens 132 is formed as a convex lens integral to the surface of output prism component 144 facing DMD 134.

A controller, which is an integral component of DMD 134, provides electrical signals to direct the micromechanical mirrors of DMD 134 to the desired light reflecting states. In their on-state, the micromechanical mirrors of DMD 134 receive the incident beam and reflect an on-state reflected light beam characterized by a principal ray $116_r$. The micromechanical mirrors in their on-state reflect principal ray $116_r$ at a 4 degree angle relative to the normal of the X-Z horizontal plane and the projection of principal ray $116_r$ onto the X-Z horizontal plane is parallel to the X-axis. The 4 degree off-normal angle causes principal ray $116_r$ to strike a top surface 152 of prism component 144 at an angle that is greater than the characteristic critical angle of the glass from which prism component 144 is formed.

Principal ray $116_r$ by total internal reflection reflects off top surface 152 at air space interface 146 and propagates through prism component 144 to an exit surface 160. An imaging beam derived from principal ray $116_r$ of the on-state reflected light beam is characterized by a principal ray 162 and propagates through exit surface 160.

Principal ray 162 propagates generally in the X direction, traveling upwardly at a +4 degree angle relative to the X-Z plane. The imaging beam propagates toward a projection lens 164 to a projector screen (not shown) to display an image to a viewer.

In their off-state, the micromechanical mirrors of DMD 134 receive the incident beam and reflect an off-state reflected light beam characterized by a principal ray $116_o$. The micromechanical mirrors in their off-state reflect principal ray $116_o$ at a 44 degree angle relative to the normal of the X-Z horizontal plane and the projection of principal ray $116_o$ onto the X-Z horizontal plane at a 42 degree angle of rotation from the X-axis. The 44 degree angle causes principal ray $116_o$, to propagate onto a side surface 170 of prism component 144. Side surface 170 is coated with an absorptive coating such as black paint, so that principal ray $116_o$ will not be internally reflected by side surface 170, but will be absorbed by the absorptive coating. The absorptive coating functions to prevent off-state light from otherwise reflecting by total internal reflection off side surface 170 and entering projection lens 164 as stray light. The stray light would scatter inside the lens barrel, propagate through projection lens 164, and be projected onto the display screen.

Figure 4:
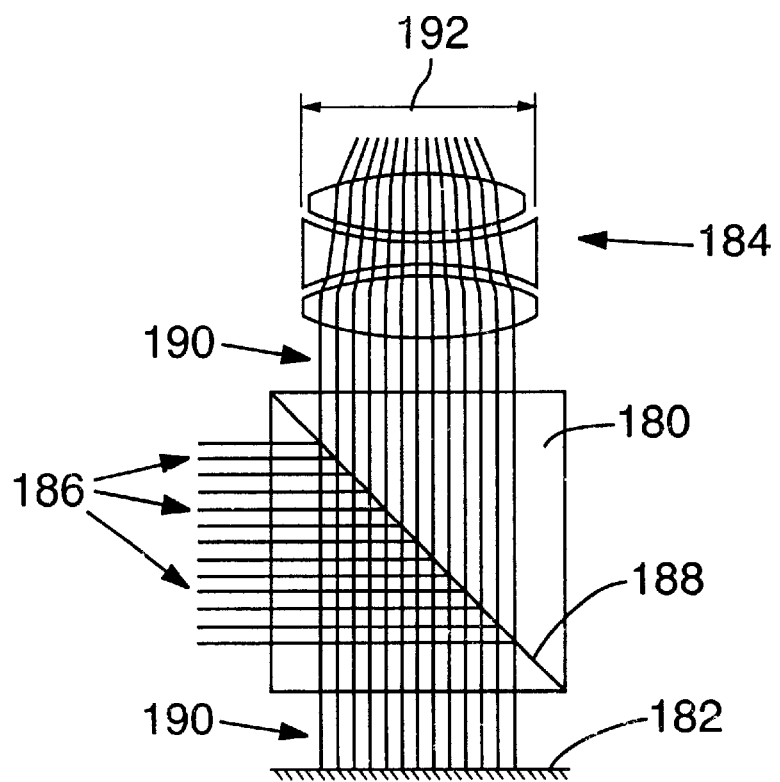
FIG. 4 is a simplified pictorial side view of a prior art prism assembly, reflective light modulator, and projection lens showing a telecentric ray tracing through the prism assembly that requires a large light entry pupil for the projection lens.

FIG. 4 shows a representative conventional prism assembly 180, reflective light modulator 182, and projection lens 184. An incident light bundle 186 (shown in solid lines) enters prism assembly 180 telecentrically, reflects off an internal surface 188, and propagates telecentrically toward reflective light modulator 182, which reflects an imaging light bundle 190 that propagates telecentrically through prism assembly 180 and internal surface 188, and propagates telecentrically toward projection lens 184.

Because imaging light bundle 190 propagates through and exits prism assembly 180 telecentrically, projection lens 184 requires a light entry pupil having a diameter 192 compatible with the typical 0.5 inch (12.7 mm) to 1.25 in (31.75 mm) diagonal dimension of the reflective surface of reflective light modulator 182. For example, the diameter of the entry pupil optics of prior art projection lens 64 (FIGS. 1A to 1D) is about 1.6 inches (40 mm).

Figure 5:
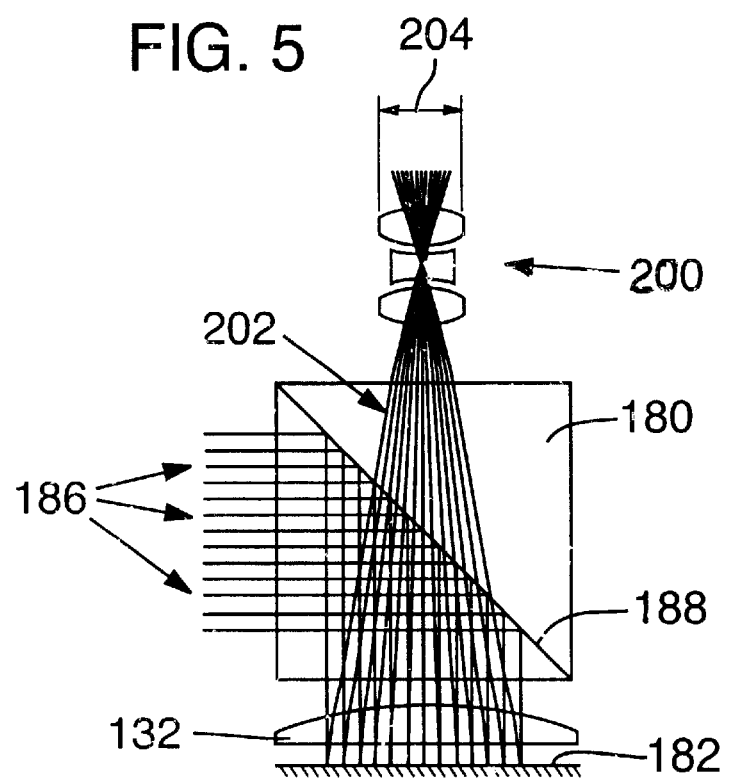
FIG. 5 is a simplified pictorial side view of a prism assembly, reflective light modulator, focusing lens, and reduced size projection lens of this invention showing a focused ray tracing through the prism assembly that requires a relatively small light entry pupil for the projection lens.

In contrast, FIG. 5 shows a preferred embodiment of this invention in which prism assembly 180 and reflective light modulator 182 are employed in combination with focusing lens 132 and a compact projection lens 200. Incident light bundle 186 enters prism assembly 180 telecentrically, reflects off internal surface 188, and propagates telecentrically toward reflective light modulator 182. However, in this invention, focusing lens 132 refracts incident light bundle 186 as it propagates toward reflective light modulator 182. A reflected imaging light bundle 202 is refracted again by focusing lens 132 causing imaging light bundle 202 to converge as it propagates through prism assembly 180 and exits toward compact projection lens 200.

Because imaging light bundle 202 converges as it propagates through and exit prism assembly 180, projection lens 200 requires a relative small light entry pupil having a diameter 204 that is about 30- to 50-percent the diameter of prior art entry pupils. For example, the diameter of the entry pupil optics of projection lens 164 (FIGS. 2A to 2E) is less than about 0.8 inch (20 mm). Projection lens 200 is further advantageous because it has a mass and a length that is about 50 to 75 percent of prior art projection lenses. (Compare FIGS. 1 and 2.)

As shown by way of example in FIGS. 3B and 3C, to further reduce mass and profile, focusing lens 132 may, alternatively, be implemented as a curved surface on the side of prism assembly 130 facing DMD 134 or whatever reflective light modulator is employed. Likewise, referring to FIG. 5, focusing lens 132 may be similarly formed as a curved surface on the side of prism assembly 180 facing DMD 182. The focusing lens may otherwise be positioned at, formed in, attached to, or bonded to a surface of any such prism assembly.

Skilled workers will recognize that portions of this invention may be implemented differently from the implementations described above. For example, prism assemblies 130 and 180 may include many types of prisms, such as a TIR prism, a polarization beam splitting prism, and a color combining prism (Philips prism or cube). The converging imaging light bundle propagating through the prism may also propagate through several optional optical elements (not shown), such as prisms, lenses, mirrors, and dichroic filters before entering the projection lens.

The implementation of this invention shown in FIGS. 2 and 3 is merely an illustrative example. More practical embodiments would employ the optical components of FIG. 5. For example, depending on the application, prism 180 may be employed to allow mounting the reflective light modulator at a position facing a side or rear surface of the prism, thereby reducing the height or profile of the resulting projector.

The reflective light modulator employed with this invention may be a device other than a DMD, such as a reflective liquid crystal device.

It will be obvious to those having skill in the art that many changes may be made to the details of the above-described embodiments of this invention without departing from the underlying principles thereof. For example, although they are described with reference to DMD-based image projection systems, the focusing lens, prism assembly, and compact projection lens combination of this invention can be advantageously implemented in other types of image display systems. The scope of this invention should, therefore, be determined only by the following claims.

What is claimed is:

1. An image display system, comprising:
    a light source from which an illumination light beam propagates;
    a reflective light modulator responsive to a control signal to reflect selected portions of an incident light bundle at controlled angles of reflection;
    a prism assembly positioned between the light source and the reflective light modulator so that the illumination light beam enters and propagates through the prism assembly and is directed toward the reflective light modulator; and
    a focusing lens element receiving the illumination light beam and refracting it as the incident light bundle toward the reflective light modulator, the reflective light modulator reflecting the selected portions of the incident light bundle as an imaging light bundle that returns through the focusing lens element to form a converging imaging light bundle that reenters, propagates through, and exits the prism assembly.

2. The apparatus of claim 1 in which the focusing lens element is positioned adjacent to a surface of the prism assembly.

3. The apparatus of claim 1 in which the focusing lens element is formed on a surface of the prism assembly.

4. The apparatus of claim 1 in which the focusing lens element is attached or bonded to a surface of the prism assembly.

5. The apparatus of claim 1 further including a projection lens having an input pupil diameter that substantially matches a diameter of the converging imaging light bundle as it enters the projection lens.

6. The apparatus of claim 1 in which the reflective light modulator has a reflective surface with a diagonal dimension, and the apparatus further includes a projection lens having an input pupil diameter that is 50 percent or less of the diagonal dimension.

7. The apparatus of claim 1 in which the prism assembly includes first and second prism components separated by a discrimination region, the first prism component having an entrance surface on which the illumination light beam is incident at an angle defined by an illumination beam vector direction and the second prism component having an exit surface from which the converging imaging light bundle exits at an angle defined by an imaging bundle vector direction, and the first and second prism components having shapes and surface angles that cooperate to produce propagation of the converging imaging light bundle so that the illumination beam and imaging bundle vector directions are substantially in a horizontal datum orientation.

8. The apparatus of claim 1 in which the prism assembly includes a TIR prism, a polarization beam splitting prism, a color combining prism, a Philips prism, or a cube prism.

9. The apparatus claim 1 in which the reflective light modulator includes a digital micromirror device or a reflective liquid crystal device.

10. The apparatus of claim 1 in which the image display system has a mass less that about 2.27 kilograms and a height less than about 6.35 centimeters.

11. A method for making an image display system, comprising:
    providing a light source from which an illumination light beam propagates;
    providing a reflective light modulator for selectively reflecting portions of an incident light bundle at controlled angles of reflection;
    positioning a prism assembly between the light source and the reflective light modulator so that the illumination light beam enters and propagates through the prism assembly and is directed toward the reflective light modulator; and
    positioning a focusing lens element for receiving the illumination light beam and refracting it as the incident light bundle toward the reflective light modulator, the reflective light modulator reflecting the selected portions of the incident light bundle as an imaging light bundle that returns through the focusing lens element to form a converging imaging light bundle that reenters, propagates through, and exits the prism assembly.

12. The method of claim 11 further including positioning the focusing lens element adjacent to a surface of the prism assembly.

13. The method of claim 11 further including forming the focusing lens element on a surface of the prism assembly.

14. The method of claim 11 further including attaching or bonding the focusing lens element to a surface of the prism assembly.

15. The method of claim 11 further including providing a projection lens having an input pupil diameter that substantially matches a diameter of the converging imaging light bundle as it enters the projection lens.

16. The method of claim 11 in which the reflective light modulator has a reflective surface with a diagonal dimension, and the method further includes providing a projection lens having an input pupil diameter that is 50 percent or less of the diagonal dimension.

17. The method claim 11 in which the reflective light modulator includes a digital micromirror device or a reflective liquid crystal device.

* * * * *